United States Patent
He et al.

(10) Patent No.: US 11,173,775 B2
(45) Date of Patent: Nov. 16, 2021

(54) CLOSED LOOP FEEDBACK CONTROL TO MITIGATE LITHIUM PLATING IN ELECTRIFIED VEHICLE BATTERY

(71) Applicant: Ford Global Technologies, LLC, Dearborn, MI (US)

(72) Inventors: Chuan He, Northville, MI (US); Xu Wang, Northville, MI (US); Haiyan Chen, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1065 days.

(21) Appl. No.: 15/001,562

(22) Filed: Jan. 20, 2016

(65) Prior Publication Data

US 2017/0203654 A1 Jul. 20, 2017

(51) Int. Cl.
*B60L 50/16* (2019.01)
*B60W 20/13* (2016.01)
(Continued)

(52) U.S. Cl.
CPC .............. *B60K 1/04* (2013.01); *B60L 3/0046* (2013.01); *B60L 7/10* (2013.01); *B60L 50/16* (2019.02);
(Continued)

(58) Field of Classification Search
CPC ............ G01N 27/4161; G01R 31/3606; G01R 31/362; G01R 31/3624; G01R 31/3679;
(Continued)

(56) References Cited

U.S. PATENT DOCUMENTS 5,729,116 A 3/1998 Tsenter
5,998,969 A 12/1999 Tsuji et al.
(Continued)

FOREIGN PATENT DOCUMENTS

CN 103370814 A 10/2013
CN 104103851 A 10/2014
(Continued)

OTHER PUBLICATIONS

J.C. Burns, D.A. Stevens, and J.R. Dahn; In-Situ Detection of Lithium Plating Using High Precision Coulometry; Journal of the Electrochemical Society; Jan. 19, 2015; pp. 959-964; Department of Physics and Atmospheric Science, Dalhousie University, Halifax, Nova Scotia B3H 4R2, Canada.
(Continued)

*Primary Examiner* — Drew A Dunn
*Assistant Examiner* — Sailesh Thapa
(74) *Attorney, Agent, or Firm* — David B Kelley; Brooks Kushman P.C.

(57) ABSTRACT

A vehicle having a traction battery with at least one cell includes a controller coupled to the traction battery and programmed to modify traction battery current in response to a difference between a lithium plating parameter target value and a lithium plating parameter actual value to reduce the difference. The lithium plating parameter or indicator may be based on a differential open circuit voltage of a battery cell, or a ratio of differential voltage of the at least one cell as a function of time to cell charging rate of the at least one cell.

17 Claims, 6 Drawing Sheets

(51) Int. Cl.
*B60W 20/14* (2016.01)
*B60L 7/10* (2006.01)
*B60W 10/06* (2006.01)
*B60W 10/26* (2006.01)
*H01M 10/0525* (2010.01)
*H01M 10/42* (2006.01)
*H01M 10/48* (2006.01)
*B60K 1/04* (2019.01)
*B60L 3/00* (2019.01)
*B60L 58/12* (2019.01)
*B60L 58/15* (2019.01)
*B60L 58/14* (2019.01)

(52) U.S. Cl.
CPC ............ *B60L 58/14* (2019.02); *B60L 58/15* (2019.02); *B60W 10/06* (2013.01); *B60W 10/26* (2013.01); *B60W 20/13* (2016.01); *B60W 20/14* (2016.01); *H01M 10/0525* (2013.01); *H01M 10/425* (2013.01); *H01M 10/48* (2013.01); *B60K 2001/0416* (2013.01); *B60L 2240/545* (2013.01); *B60L 2240/547* (2013.01); *B60L 2240/549* (2013.01); *B60W 2710/248* (2013.01); *B60Y 2200/92* (2013.01); *B60Y 2400/112* (2013.01); *H01M 2010/4271* (2013.01); *H01M 2010/4278* (2013.01); *H01M 2220/20* (2013.01); *Y02T 10/70* (2013.01); *Y10S 903/907* (2013.01)

(58) Field of Classification Search
CPC ......... H01M 10/4221; H01M 10/4285; H01M 10/48; H01M 10/052; H01M 10/0525; H01M 10/425; H01M 2010/4271; H01M 2010/4278; H01M 2220/20; B60K 1/04; B60K 2001/0416; B60L 58/15; B60L 58/14; B60L 3/0046; B60L 50/16; B60L 7/10; B60L 2240/545; B60L 2240/547; B60L 2240/549; B60L 58/27; B60L 58/10; B60W 20/13; B60W 20/14; B60W 10/06; B60W 10/26; B60W 2710/248; Y02T 10/70; B60Y 2200/92; B60Y 2400/112; Y10S 903/907; Y02E 60/10

See application file for complete search history.

(56) References Cited

U.S. PATENT DOCUMENTS

| | | | |
|---|---|---|---|
| 6,040,685 A | 3/2000 | Tsenter et al. | |
| 6,366,056 B1 | 4/2002 | Podrazhansky et al. | |
| 8,901,885 B2 | 12/2014 | Kelty et al. | |
| 2009/0104510 A1* | 4/2009 | Fulop | H01M 2/30 429/50 |
| 2011/0298417 A1 | 12/2011 | Stewart et al. | |
| 2014/0011072 A1 | 1/2014 | Leuthner et al. | |
| 2014/0023888 A1 | 1/2014 | Fulop et al. | |
| 2015/0147614 A1* | 5/2015 | Wang | H01M 10/4285 429/93 |
| 2017/0190262 A1* | 7/2017 | Jin | B60L 58/12 |
| 2017/0234930 A1* | 8/2017 | Lee | G01N 27/02 320/162 |

FOREIGN PATENT DOCUMENTS

| | | | | |
|---|---|---|---|---|
| DE | 102013012164 A1 * | 1/2015 | ......... | H01M 10/443 |
| JP | 2011057025 A * | 3/2011 | | |
| KR | 1020110085018 A | 7/2011 | | |
| WO | 2015077669 A1 | 5/2015 | | |

OTHER PUBLICATIONS

Mathias Petzl and Michael A. Danzer; Nondestructive detection, characterization, and quantification of lithium plating in commercial lithium-ion batteries; Journal of Power Sources 254; Aug. 20, 2013; pp. 80-87.

* cited by examiner

CLOSED LOOP FEEDBACK CONTROL TO MITIGATE LITHIUM PLATING IN ELECTRIFIED VEHICLE BATTERY

CROSS-REFERENCE TO RELATED APPLICATIONS

This application includes subject matter similar to commonly owned U.S. Ser. No. 15/001,520, filed Jan. 20, 2016; and U.S. Ser. No. 15/001,618, filed Jan. 20, 2016.

TECHNICAL FIELD

This disclosure relates to closed loop feedback control of an electrified vehicle in response to detection of lithium plating in a vehicle battery.

BACKGROUND

Electrified vehicles, such as hybrid, plug-in hybrid, and battery electric vehicles use an electric machine powered by a traction battery to drive the vehicle powertrain. Charging and discharging of the battery results in electrochemical processes that affect the charge available to power the vehicle and may vary with ambient and operating conditions such as battery state of charge (SOC), temperature, battery cell balance, and charging/discharging rate or current, for example. In lithium-ion (Li-ion) batteries, metallic lithium may be deposited on the anodes of battery cells under some operating conditions, which may degrade battery performance. Batteries are particularly susceptible to this process, referred to as lithium plating, under low operating temperature and high charging currents, although lithium plating may occur under other ambient and operating conditions.

SUMMARY

In various embodiments, a vehicle having a traction battery with at least one cell includes a controller coupled to the traction battery and programmed to provide closed loop feedback control of the vehicle or the traction battery to reduce a difference between a measured value of a lithium plating indicator and a target or desired value of the plating indicator that represents minimal or no lithium plating. Embodiments include controlling battery charge rate, regenerative braking current supplied to the battery, accessory loads affecting battery discharge current, and engine power. In one or more embodiments, a battery power vs. temperature table is updated in response to detection of lithium plating. Embodiments may also include updating an accumulated plating history based on battery power during charging while plating is detected.

Embodiments according to the present disclosure may provide one or more advantages. For example, closed loop feedback control of a lithium plating indicator using one or more vehicle systems or components may reduce or eliminate plating to enhance battery performance, capacity, and lifetime. Various embodiments employ program logic to perform closed loop feedback control using existing battery and vehicle sensors so that additional hardware is unnecessary.

The above advantages and other advantages and features associated with various embodiments will be readily apparent to those of ordinary skill in the art from the following detailed description when taken in connection with the accompanying drawings.

DETAILED DESCRIPTION

As required, detailed embodiments are disclosed herein; however, it is to be understood that the disclosed embodiments are merely representative of the claimed subject matter and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed.

Figure 1:
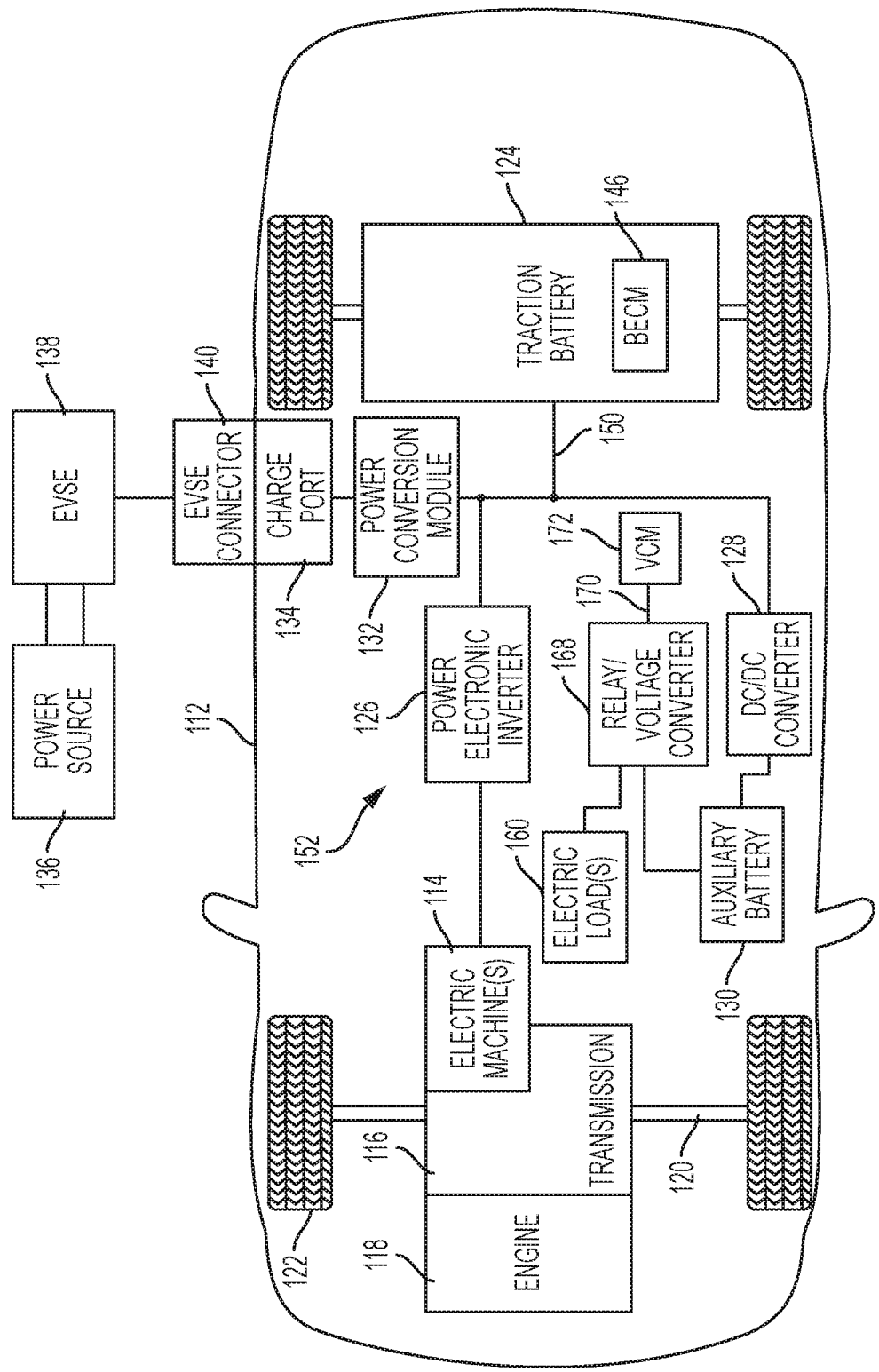
FIG. 1 is a block diagram illustrating an electrified vehicle having closed loop control of lithium plating according to a representative embodiment.

FIG. 1 is a block diagram of a representative electrified vehicle embodiment having at least one controller programmed to provide closed loop feedback control of a vehicle or traction battery in response to a lithium plating indicator value relative to a target value associated with minimal or no lithium plating. While a plug-in hybrid vehicle having an internal combustion engine is illustrated in this representative embodiment, those of ordinary skill in the art will recognize that the disclosed embodiments illustrating closed loop feedback control based on a lithium plating indicator may also be utilized in other types of electrified vehicles. The systems and methods for closed loop feedback control in the representative embodiments are independent of the particular vehicle powertrain with exceptions apparent to those of ordinary skill in the art. For example, controlling an engine to reduce current supplied to the traction battery would not be applicable to a battery electric vehicle. Representative vehicle applications may include hybrid vehicles, electric vehicles, or any other type of vehicle having a battery subject to performance degradation associated with lithium plating.

In the representative implementation illustrated in FIG. 1, a plug-in hybrid-electric vehicle 112 may include one or more electric machines 114 mechanically connected to a transmission 116. The electric machines 114 may be capable of operating as a motor or a generator. For hybrid vehicles, a transmission 116 is mechanically connected to an internal combustion engine 118. The transmission 116 is also mechanically connected to a drive shaft 120 that is mechanically connected to the wheels 122. The description herein is equally applicable to a battery electric vehicle (BEV), where the hybrid transmission 116 may be a gear box connected to an electric machine 114 and the engine 118 may be omitted as previously described. The electric machines 114 can provide propulsion and deceleration capability whether or not the engine 118 is operating. The electric machines 114 also act as generators and can provide fuel economy benefits by recovering energy that would normally be lost as heat in the friction braking system during regenerative braking. As described in greater detail below, the engine 118 may be controlled to reduce power supplied to electric machines 114 by a closed loop feedback controller to reduce a difference between a target and measured value of a lithium plating indicator. Similarly, regenerative braking may be controlled to modify the lithium plating indicator value and associated lithium plating processes.

For hybrid or electric vehicle applications, a traction battery or traction battery pack 124 stores energy in a plurality of individual battery cells connected together to provide a desired voltage and charge capacity for the electric machines 114. In one embodiment, battery pack 124 includes an array of lithium-ion battery cells. Lithium plating (also referred to herein as "plating") refers to the process where metallic lithium is deposited on the negative electrodes or anodes of the battery cells and may lead to long-term effects such as capacity loss, increased impedance, decreased efficiency, and in some cases an internal short circuit, for example, depending on the particular structural characteristics of the deposited lithium. Some degree of plating may be reversed during a process referred to as stripping. Irreversible plating may result in permanent damage to the cell anode. As such, various embodiments according to the present disclosure utilize a vehicle or battery controller programmed to implement a closed loop feedback control strategy based on a lithium plating indicator value to control the vehicle and/or traction battery in response to a difference between a target indicator value and a measured/calculated indicator value to reduce or eliminate lithium plating. Control of battery charging and discharging may be used to strip reversibly plated anodes as well as to reduce or eliminate additional plating. Battery cells are particularly susceptible to plating during charging at low temperatures, high state of charge (SOC), and high charging rates (high current). As such, control of the battery and/or vehicle may include controlling traction battery current to reduce or reverse (strip) lithium plating. Various strategies may be used to calculate a lithium plating indicator value for use by the closed loop feedback controller with representative strategies illustrated and described with reference to FIGS. 2-4.

Vehicle battery pack 124 typically provides a high voltage DC output to a high voltage bus 150, although the voltage and current may vary depending on particular operating conditions and loads. The traction battery pack 124 is electrically connected to one or more external circuits 152, which may include a power electronics or inverter circuit 126, a DC/DC converter circuit 128 and/or a power conversion module or circuit 132, for example. One or more contactors may isolate the traction battery pack 124 from other components when opened, and connect the traction battery pack 124 to the other components when closed. Traction battery pack 124 may include various internal circuits for measuring and monitoring various operating parameters including cell current and individual cell voltage. Parameters such as voltage, current and resistance for a battery cell or a group of battery cells (sometimes referred to as a block or brick) may be monitored and/or controlled by the BECM 146.

In addition to providing energy for propulsion, the traction battery pack 124 may provide energy for other external circuits 152 connected to the high voltage bus 150. The power distribution system of vehicle 112 may also include a DC/DC converter module or circuit 128 that converts the high voltage DC output of the traction battery 124 to a low voltage DC supply that is compatible with other vehicle loads that may be directly connected. Other external high voltage circuits or loads, such as those for cabin or component heaters, may be connected directly to the high voltage bus 50 without the use of a DC/DC converter module 128.

Vehicle 112 may also include an auxiliary battery 130 having a relatively lower nominal voltage (such as 24V or 48V, for example) and may be implemented using different battery chemistries than the traction battery pack 124. Auxiliary battery 130 may also be referred to as a low-voltage battery, starter battery or simply the vehicle battery for various applications. Auxiliary battery 130 may be used to power various low-voltage components, controllers, modules, motors, actuators, sensors, etc. generally represented by electric loads 160. One or more relay/voltage converters 168 may be used to power vehicle electrical load(s) 160. In this embodiment, relay/voltage converter 168 includes a relay controlled by a relay input signal 170 provided by a vehicle control module (VCM) 172, which may also be used to directly or indirectly control the vehicle and/or traction battery 124 using the battery energy control module (BECM) 146. As described in greater detail below, one or more electrical components or accessories may be controlled by VCM 172 and/or BECM 146 to control lithium plating by controlling battery current.

Traction battery pack 124 may be recharged by an external power source 136. The external power source 136 may include an electrical outlet connected to the power grid. The external power source 136 may be electrically connected to electric vehicle supply equipment (EVSE) 138. The EVSE 138 may provide circuitry and controls to regulate and manage the transfer of energy between the power source 136 and the vehicle 112. The external power source 136 may provide DC or AC electric power to the EVSE 138. The EVSE 138 may have a charge connector 140 for plugging into a charge port 134 of the vehicle 112. The charge port 134 may be electrically connected to a charger or on-board power conversion module 132. Alternatively, various components described as being electrically connected may transfer power using a wireless inductive coupling. As described in greater detail below, the power conversion module 132 is another representative electrical device that may be directly or indirectly controlled to limit or reverse lithium plating by controlling battery current. In some applications, battery current may be reduced or stopped during charging, or may be reversed to provide current o the external power source 136 to reduce or reverse lithium plating.

The various components illustrated in FIG. 1 may have one or more associated controllers, control modules, and/or processors such as VCM 172 to control vehicle and traction battery operation based on a lithium plating indicator value. The controllers may communicate via a serial peripheral interface (SPI) bus (e.g., Controller Area Network (CAN)) or via discrete conductors. Various operating parameters or variables may be broadcast or published using the CAN or other conductors for use by vehicle control modules or sub-modules in controlling the vehicle or vehicle components, such as the traction battery pack 124 or electric load(s) 160, for example. One or more controllers may operate in a stand-alone manner without communication with one or more other controllers. The controllers may include a Battery Energy Control Module (BECM) 146 to control various charging and discharging functions, battery cell charge balancing, battery pack voltage measurements, individual battery cell voltage measurements, battery overcharge protection, battery over-discharge protection, battery end-of-life determination, closed loop feedback control of lithium plating, battery current polarity or direction (charging and discharging), etc.

The controllers may include and/or communicate with various types of non-transitory computer readable storage media including persistent and temporary storage devices to store control logic, algorithms, programs, operating variables, and the like. In one embodiment, the BECM 146 may communicate with memory for storing values associated with battery cell desired open circuit voltage values, thresholds, or patterns. Similarly, BECM 146 may communicate with memory having values stored in lookup tables or arrays associated with battery cell internal resistance based on battery parameters such as temperature, SOC, age, etc. In one embodiment, BECM 146 communicates with a memory having a battery power vs. temperature lookup table and modifies one or more values in the lookup table in response to detecting lithium plating. BECM 146 may also communicate with a memory storing an accumulated plating history corresponding to battery charging power supplied under lithium plating conditions for use in determination of a battery life estimate.

Figure 2:
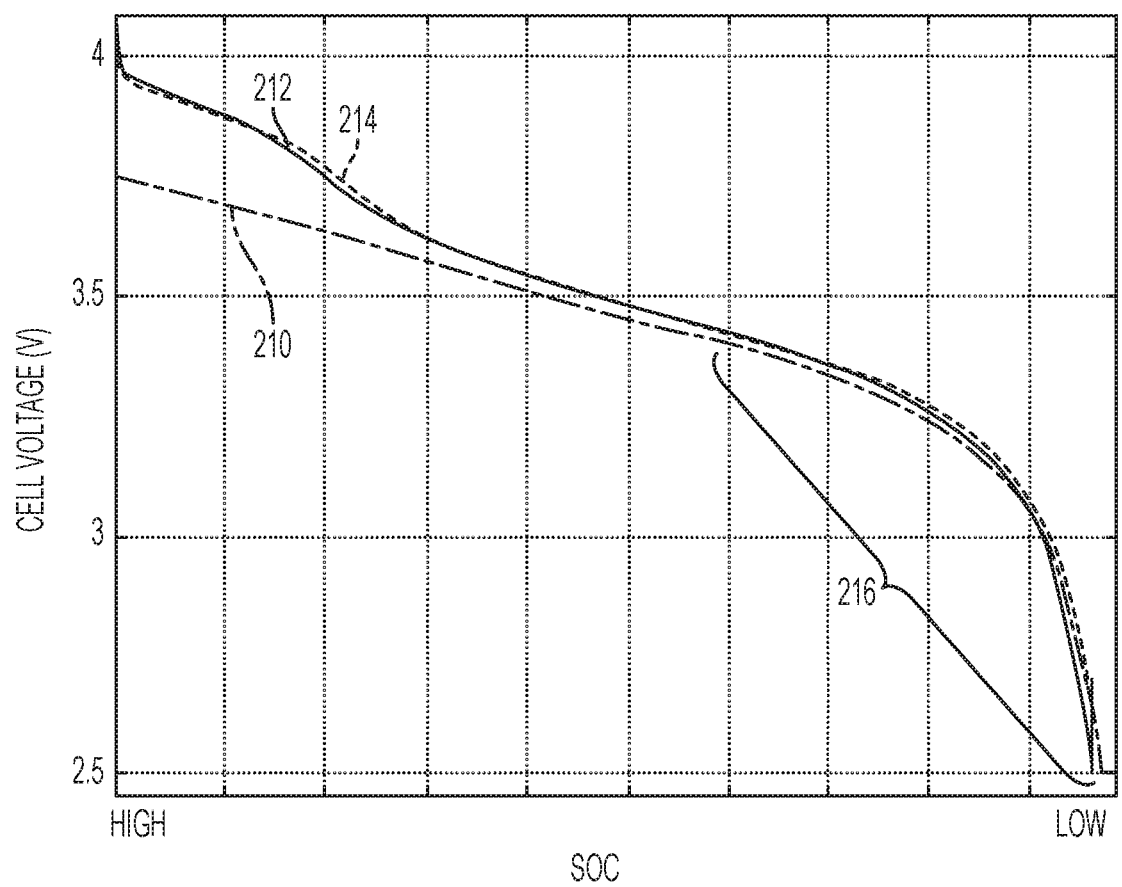
FIG. 2 is a graph illustrating cell voltage as a function of SOC for unplated and plated battery cells for use in a lithium plating parameter or indicator for closed loop control according to a representative embodiment.

FIG. 2 is a graph illustrating cell voltage as a function of SOC for unplated and plated battery cells for use in calculating a lithium plating indicator value and closed loop feedback control of the indicator value according to a representative embodiment. The graph of FIG. 2 was generated using empirical data for representative lithium-ion cells that may be used in a battery pack in an electrified vehicle such as the plug-in hybrid electric vehicle illustrated in FIG. 1. Data represented by line 210 correspond to cell voltage during discharging over time for a normal lithium-ion cell with little or no plating. Data represented by lines 212, 214 correspond to cell voltages during discharging over time for lithium plated cells with plating confirmed by disassembly and examination of visibly damaged anodes of the plated cells. Due to the chemical characteristics of lithium, when a battery cell is plated as previously described, the battery cell open circuit voltage (OCV) will be higher than a cell that has less or no plating.

During discharging, reversibly plated lithium may be stripped such that the discharge curves of OCV vs. SOC will be the same for plated and unplated cells. The low SOC portion of the curves generally indicated by reference numeral 216 after the end of the stripping process can be used to identify the plated cell SOC value.

In various embodiments, the expected or normal battery OCV, and/or the expected battery cell internal resistance for particular battery operating parameters, such as temperature, current, SOC, age, etc. may be stored in a memory in communication with the BECM 146. The lithium plating indicator value may correspond to a difference between a measured OCV of a least one cell and the previously stored expected OCV under similar operating conditions. The measured OCV can be calculated based on a measured battery cell voltage, current flow through the battery cell, and the battery cell internal resistance as calculated or previously stored in a memory associated with the battery control system according to:

$$OCV = V\_battery - I * R\_cell$$

where OCV represents the battery cell open circuit voltage (V), V_battery represents the measured battery cell voltage (V), I represents the current flow through the battery cell (A), and R_cell represents the battery cell internal resistance (ohms). The lithium plating indicator value corresponding to the differential OCV is then used by the closed loop feedback control the lithim plating. The plating indicator value may be determined according to:

$$\text{Plating Indicator} = OCV_{measured} - OCV_{expected}$$

One or more controllers in communication with the traction battery may be programmed to provide closed loop feedback control to reduce/eliminate a difference between a target value for the plating indicator and the measured value based on the differential OCV voltage to control the traction battery and/or vehicle for example, reduce the charge current or heat up the battery with an external heater or battery internal resistance.

Figure 3:
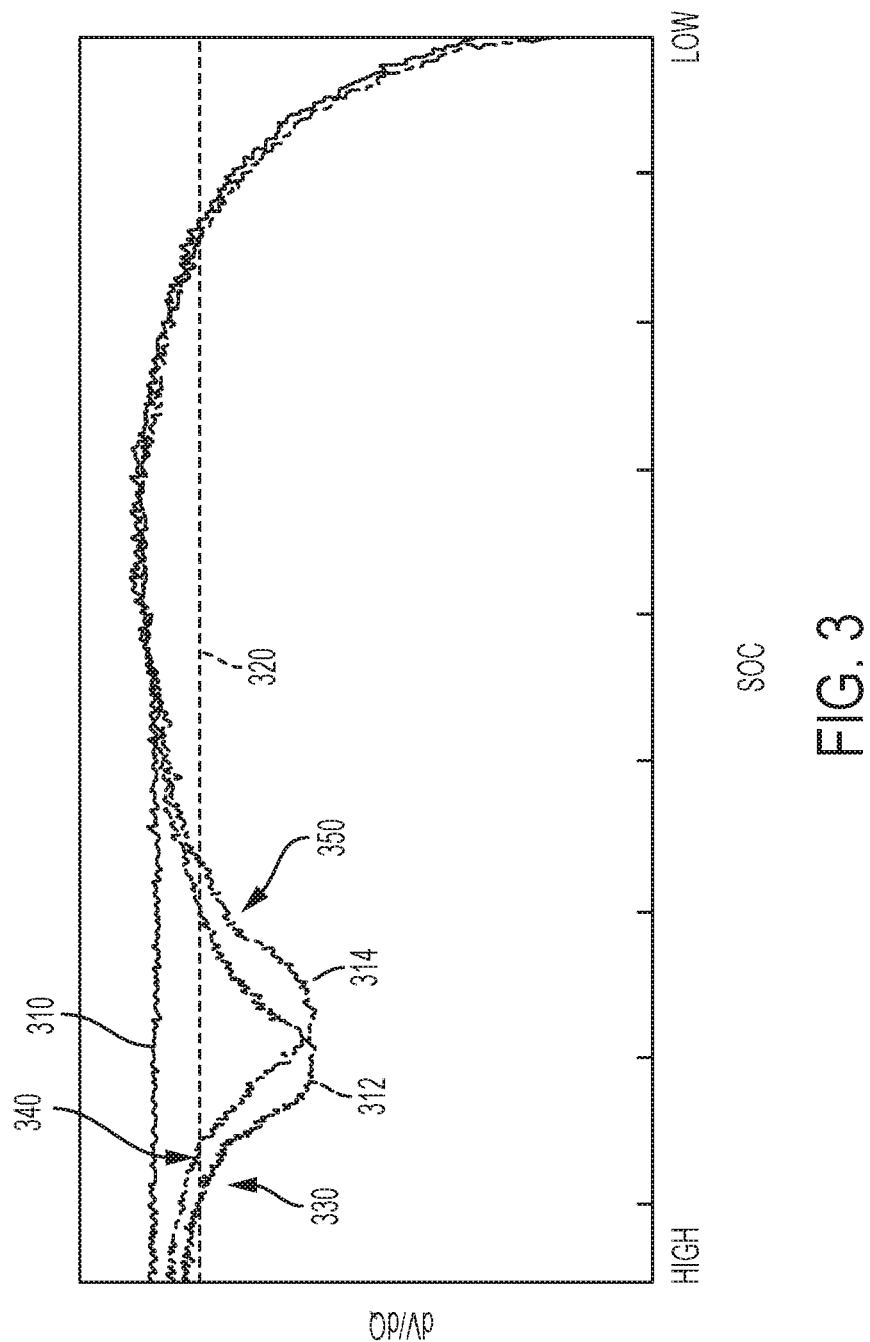
FIG. 3 is a graph illustrating a ratio of cell voltage changing rate to cell charging rate as a function of time for unplated and plated battery cells for use as a lithium plating indicator according to a representative embodiment.

FIG. 3 is a graph illustrating a ratio of cell voltage changing rate to cell charging rate as a function of time for unplated and plated battery cells for use as a plating indicator value for closed loop feedback control of lithium plating according to a representative embodiment. Data represented by line 310 correspond to ratios for a battery cell with little or no lithium plating, while data represented by lines 312, 314 correspond to ratios for battery cells exhibiting lithium plating. Line 320 corresponds to a representative threshold that may be used to compare the ratios for detection of lithium plating with lithium plating detected in response to the calculated ratio crossing the threshold as indicated at 330 for line 312 and 340 for line 314, for example. The lithium plating can also be detected by system identification techniques to identify an associated pattern related to lithium plating.

Those of ordinary skill in the art will recognize that the particular threshold may vary based on battery and/or ambient operating parameters or conditions, may be estimated online, and may be stored in memory configured as a lookup table or may be computed based on a formula or equation using empirical data to generate a mathematical expression for the threshold. Similarly, the pattern formed by the data of one or more cells over time may be compared to a corresponding expected or desired pattern for a cell without plating with a mathematical or statistical parameter, such as correlation, used to detect plating. Similarly, other ratios may be computed and used to detect plating based on empirical data associated with plated cells. The target value for the plating indicator for use in the closed loop feedback controller may be lower than the threshold that indicates plating in an attempt to prevent plating from occurring as the closed loop feedback controller will attempt to keep the plating indicator value below the threshold associated with plating.

As generally illustrated in FIG. 3, for a lithium plated battery cell, the ratio of cell voltage changing rate or differential voltage vs. cell charging rate (which may be indicated by cell current, for example), will have a clear transition when the plated lithium has stopped joining the reaction during the process. Since the ratio of cell voltage changing rate vs. cell charging rate as represented by lines 310, 312, and 314 is robust compared with a time based ratio, it is also robust to various battery operation conditions. As such, lithium plating can be controlled using the ratio of cell voltage changing rate vs. cell charging rate to minimize or prevent the ratio from crossing the associated threshold indicating lithium plating. The lithium plating can also be controlled by updating the battery power vs. temperature lookup table to reduce the battery power at the plated temperature to prevent lithium plating during subsequent battery operation.

As previously described with respect to FIG. 2, due to the chemical characteristics of lithium and the carbon anode of each battery cell, when a battery is plated, the battery cell OCV will be higher than normal or nominal battery open circuit voltage without plating. When the lithium stops joining the reaction, the cell OCV will go back to a normal OCV as generally indicated at 350. In various applications, battery cell voltage is measured inside the battery pack for individual cells or groups or bricks of cells such that the differential voltage for a particular cell or group of cells dV/dt can be calculated. The cell charging rate or rate of change of cell charge may be represented by the actual cell current (I) as represented by:

$$\frac{dQ}{dt} = I$$

The ratio of cell voltage changing rate vs. cell charge rate may be calculated as a plating indicator value by a vehicle or battery controller according to:

$$\text{ratio (plating indicator value)} = \frac{dV\_battery}{dQ} = \left(\frac{dV\_battery}{dt}\right) / \left(\frac{dQ}{dt}\right) = \left(\frac{dV}{dt}\right) / I$$

where Q represents the battery cell accumulated charge (Coulomb), V_battery represents measured battery cell voltage (V), and I represents current flow through the battery cell (A). Filters may be applied before and/or after the differential operation/calculation to reduce or eliminate signal noise.

Figure 4:
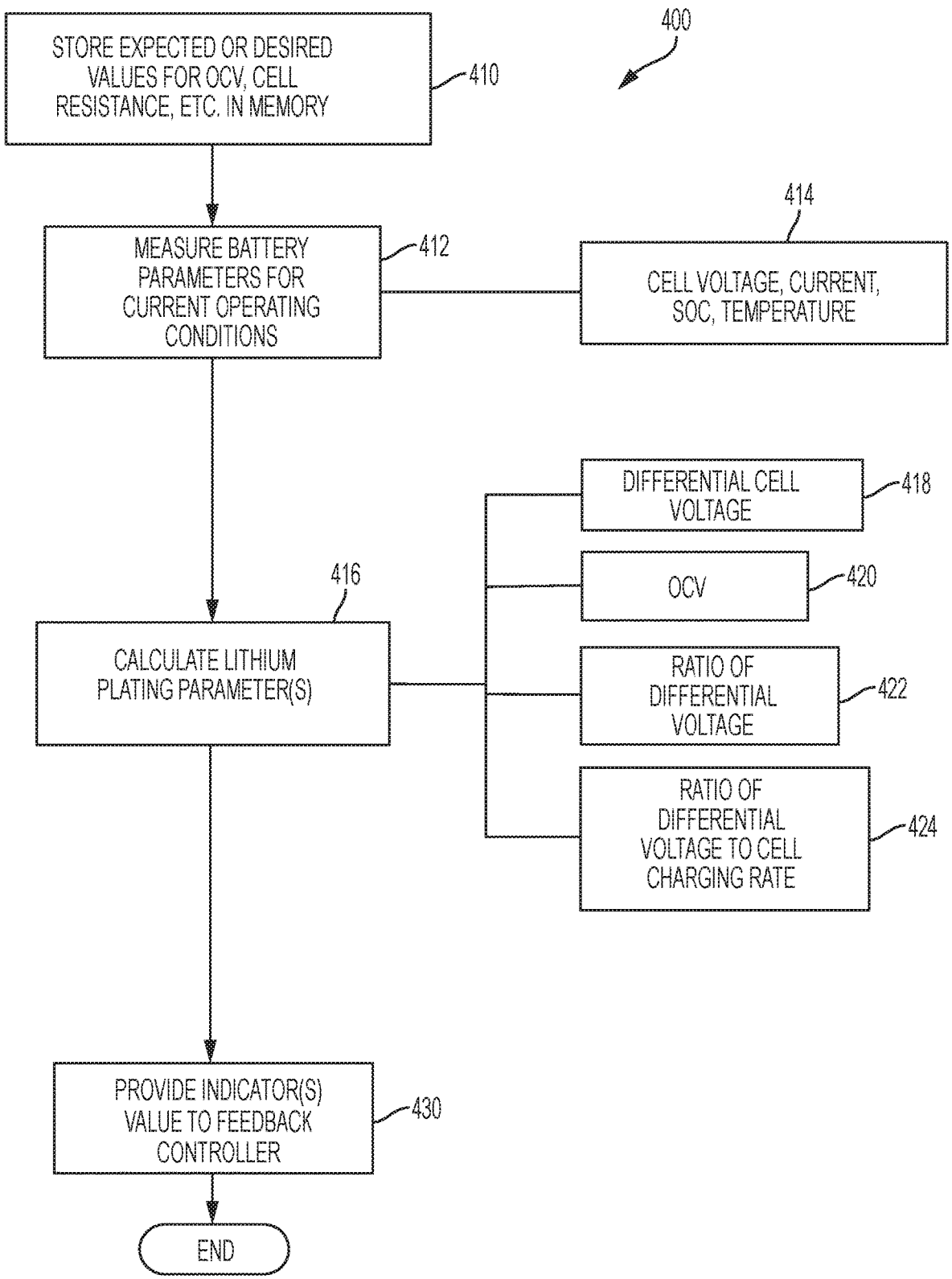
FIG. 4 is a flow chart illustrating calculation of one or more lithium plating indicators or parameters for use in closed loop feedback control of lithium plating according to a representative embodiment.

FIG. 4 is a flow chart illustrating calculation of one or more lithium plating indicators or parameters for use in closed loop feedback control of lithium plating according to a representative embodiment. The processes, systems, methods, heuristics, etc. described herein may be described as occurring in an ordered sequence although such processes could be performed with the described steps completed in an order other than the order described or illustrated. It should be understood that certain steps could be performed simultaneously, that other steps could be added, or that certain steps described herein could be omitted while keeping with the teachings of this disclosure and being encompassed by the claimed subject matter. The descriptions of methods or processes are provided for the purpose of illustrating certain embodiments, and should be understood to be representative of one of many variations and not limited to only those shown or described.

As generally understood by those of ordinary skill in the art, the system or method may be implemented through a computer algorithm, machine executable code, or software instructions programmed into one or more suitable programmable devices associated with the vehicle, such as VCM 172, BECM 146, another controller, or a combination thereof.

Operation of system or method 400 includes storing expected or desired values for various battery operating parameters as represented at 410 in a non-transitory computer readable medium or memory for subsequent use in controlling lithium plating. As previously described, battery parameter values may include expected or desired values for open circuit voltage of a representative cell or group of cells corresponding to current battery and/or ambient operating conditions. Internal battery cell resistance may also be stored for subsequent use in calculating OCV of a cell based on a measured cell voltage. Stored values may also include a battery power vs. temperature lookup table and an accumulated plating history counter. Current operating conditions are measured or otherwise determined for various battery parameters as represented by block 412. Representative parameters may include cell voltage, cell current, SOC, and temperature as represented at 414.

One or more lithium plating parameters or indicators are determined as represented by block 416. As previously described, lithium plating parameters or indicators may be based on a differential cell voltage 418, which may include a differential OCV, for example. Alternatively, measured OCV may be calculated using measured cell current, voltage, and internal resistance as previously described and represented at 420. A ratio of differential voltage may be calculated as represented at 422, and may include a ratio of differential voltage or changing voltage to cell charging rate as represented at 426. One or more lithium plating indicator values/pattern may be provided to a closed loop feedback controller as represented at 430.

Figure 5:
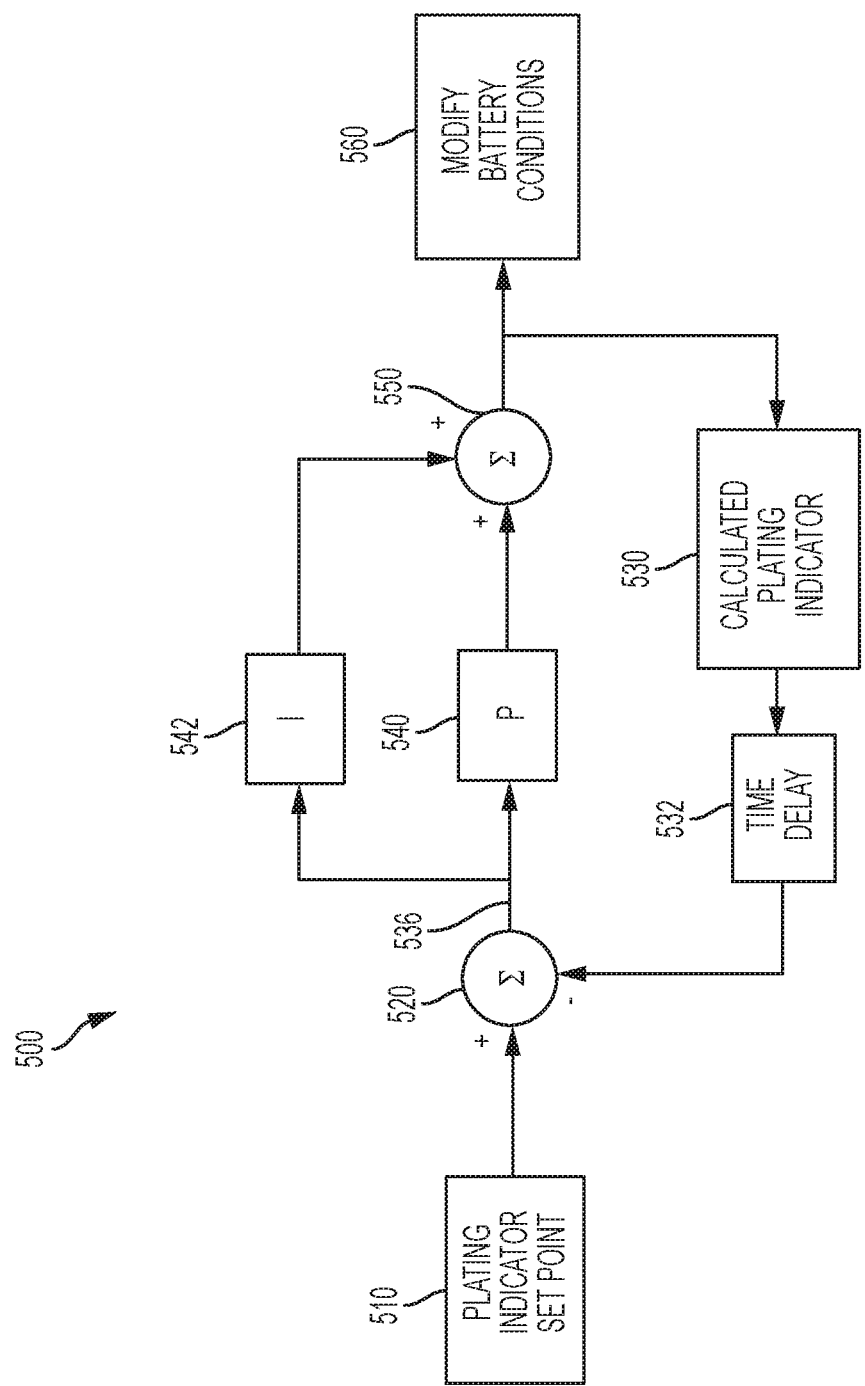
FIG. 5 is a diagram illustrating operation of a closed loop feedback controller to control vehicle and/or battery operation based on a lithium plating indicator value according to a representative embodiment.

FIG. 5 is a diagram illustrating operation of a closed loop feedback controller to control vehicle and/or battery operation based on a lithium plating indicator value according to a representative embodiment. Control system 500 generally represents a simplified proportional-integral (P-I) closed loop feedback controller. Other closed loop control strategies may be used to control lithium plating conditions consistent with the teachings of the present disclosure, include feedback, feedforward, and hybrid controllers using any combination of proportional, integral, and derivative control functions or terms. Control system 500 determines a plating indicator set point or target value as represented at 510. The set point or target value may vary based on current vehicle, battery, and/or ambient operating conditions, and will vary based on the particular plating indicator. The selected plating indicator may vary based on the current operating mode, or by application and implementation. For example, in one embodiment only a single plating indicator is provided. Other embodiments may include multiple plating indicators with an arbitration strategy to select a particular plating indicator for use by the closed loop feedback controller.

A difference or error value is calculated by summer 520 based on a difference between the indicator set point or target value and a feedback signal corresponding to a calculated plating indicator value represented by block 530 and time shifted by time delay 532. The corresponding difference value 536 is applied to a proportional term 540 and integral term 542 with the resulting values combined at summer 550. The resulting value may be used to modify battery conditions as represented at 560 to reduce the difference value 536 toward zero. The proportional term 540 and integral term 542 may be tuned to provide desired system performance.

Block 560 generally represents directly or indirectly modifying battery conditions by control of one or more battery or vehicle parameters or components to reduce or reverse lithium plating in the battery. For example, in hybrid electric vehicles and plug-in hybrid electric vehicles that have an internal combustion engine, using an external heater or cycling the battery to use battery internal resistance to increase battery temperature, modifying battery conditions may include reducing battery charge rate or current to the allowed minimum charging level, which may vary based on current operating conditions. During vehicle operation, reducing battery current may include reducing or stopping current provided by regenerative braking, or modifying an engine operating point or mode from maximum efficiency to minimum battery charge power.

In various embodiments, modifying battery conditions as represented by block 560 may include warming of the battery pack 124 by controlling one or more electrical accessories to provide power from the battery rather than the electric machine(s) operating in a generator mode, for example. This may also include reducing accessory power provided by the engine so that the electrical load of the battery and corresponding current increases to generate more heat. Increasing electric accessory load may include operating a battery pack heater or increasing the heater load to a maximum load to quickly warm the battery pack.

Figure 6:
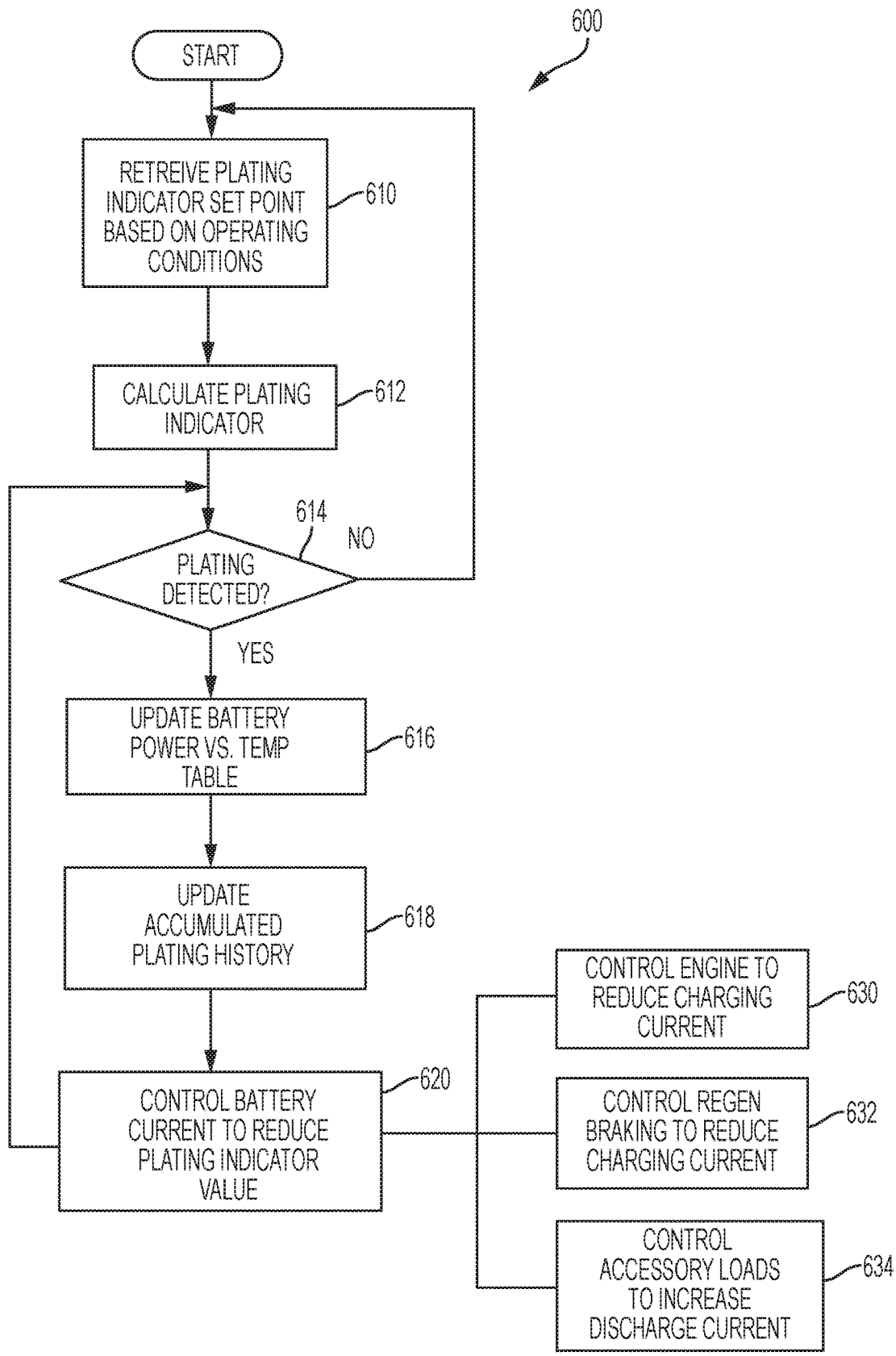
FIG. 6 is a flow chart illustrating operation of a vehicle or method for closed loop feedback control of a plating indicator affected by vehicle and/or traction battery operating conditions.

FIG. 6 is a flow chart illustrating operation of a representative embodiment of a vehicle or method for closed loop feedback control of a plating indicator affected by vehicle and/or traction battery operating conditions. In the representative embodiment illustrated in FIG. 6, control strategy 600 includes retrieving a plating indicator set point based on current operating conditions as represented at 610. Current operating conditions may include vehicle, battery, and/or ambient operating conditions such as temperature, battery current, battery pack voltage, battery cell voltage, SOC, battery age, accumulated battery plating history, for example. In applications using more than one plating indicator, a set point or target value for each plating indicator may be retrieved from values previously stored in memory.

A current value for each plating indicator is calculated as represented at 612. As previously described, representative plating indicators may include a differential voltage, or a ratio of differential voltage to charging rate, for example. One or more indicator values are used to detect plating as represented at 614. In one embodiment, plating may be detected by comparing an indicator to a corresponding threshold. In another embodiment, the closed loop feedback control may determine lithium plating when the difference or error between the target indicator value and the current indicator value exceeds a threshold. If plating is not detected, the controller continues to update the target value and current value by returning to block 610.

If plating is detected as indicated at block 614, a battery power as a function of temperature lookup table may be updated using current operating conditions to reduce the potential for plating conditions to occur during subsequent operation. For example, power provided to the battery to charge the battery may be subject to a current limit as a function of temperature based on values in the lookup table. If plating is detected, the values may be modified to reduce the power limit for a particular temperature where plating was previously detected.

An accumulated plating history counter may be updated in response to detecting plating conditions as represented at 618. For example, the counter or other history value may be updated to record a total amount of power or ampere-hours (Ah) that the battery was subject to lithium plating. The accumulated lithium plating Ah may be used to adjust the battery life estimation. Alternatively, or in combination, more aggressive mitigation strategies may be employed as the accumulated plating counter increases or crosses one or more associated thresholds.

Block 620 represents controlling battery current to reduce the lithium plating indicator difference or error value to provide closed loop feedback control. As previously described, this may include controlling an engine operating point to reduce charging current supplied to the battery as represented at 630, controlling regenerative braking to reduce charging current supplied to the battery as represented at 632, or controlling accessory loads to increase discharge current and raise battery temperature as represented at 634. Battery temperature may be increased indirectly by controlling accessories to increase electrical load and current supplied by the battery and/or directly by controlling a battery heater, for example.

As those of ordinary skill in the art may recognize, the representative embodiments described may provide one or more advantages such as controlling a traction battery to reduce or reverse lithium plating based on closed loop feedback control of a lithium plating indicator. Online non-destructive lithium plating indicators are provided to mitigate irreversible lithium plating and associated performance degradation to extend battery life and capacity.

While representative embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly described or illustrated. While various embodiments may have been described as providing advantages or being preferred over other embodiments or prior art implementations with respect to one or more desired characteristics, as one of ordinary skill in the art is aware, one or more features or characteristics may be compromised to achieve desired overall system attributes, which depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A vehicle comprising:
    a traction battery having a plurality of cells; and
    a controller in communication with the traction battery and programmed to control the traction battery or the vehicle in response to a difference between a target value and a current value of a lithium plating indicator, wherein the lithium plating indicator is based on a ratio of the differential cell voltage and cell current during charging of the traction battery, wherein the controller is further programmed to modify a previously stored lookup table of battery charging power vs. temperature in response to the difference exceeding a corresponding threshold.

2. The vehicle of claim 1, wherein the controller is programmed to control the traction battery to reduce the difference toward zero.

3. The vehicle of claim 1, wherein the controller is further programmed to modify a previously stored accumulated lithium plating counter in response to the difference exceeding a corresponding threshold.

4. The vehicle of claim 1 further comprising an internal combustion engine, wherein the controller is further programmed to modify an operating point of the internal combustion engine to reduce the difference.

5. The vehicle of claim 1, wherein the controller is further programmed to control regenerative braking current to reduce the difference.

6. The vehicle of claim 1, wherein the controller is programmed to operate at least one electrical accessory to increase fraction battery current.

7. The vehicle of claim 1, wherein the controller is further programmed to operate a traction battery heater to reduce the difference.

8. A vehicle having a traction battery with at least one cell, comprising:
    an internal combustion engine; and
    a controller coupled to the traction battery and programmed to modify traction battery current, modify an operating point of the internal combustion engine, and modify a previously stored lookup table of battery charging power vs. temperature in response to a difference between a lithium plating parameter target value and a lithium plating parameter actual value to reduce the difference, the lithium plating parameter based on a ratio of differential voltage of the at least one cell as a function of time to cell charging rate of the at least one cell.

9. The vehicle of claim 8, wherein the controller further modifying the operating point to reduce battery charging current.

10. The vehicle of claim 8, wherein the controller further reducing regenerative braking current to modify the battery current.

11. The vehicle of claim 8, wherein the controller further modifying a stored battery power limit associated with a current battery temperature in response to the difference exceeding a threshold.

12. The vehicle of claim 8, wherein the controller further tracking accumulated traction battery power during battery charging when the difference exceeds a corresponding threshold.

13. The vehicle of claim 8, wherein the controller is further programmed to identify a lithium plated cell based on a relationship between open circuit voltage and fraction battery state of charge (SOC) for SOC values below a threshold after discharging of the fraction battery for a predetermined time to allow completion of lithium stripping.

14. A vehicle comprising:
    an engine configured to power driven wheels;
    an electric machine configured to power the driven wheels;
    a transmission coupled to the engine and the electric machine such that the engine rotates the electric machine in at least one operating state;
    a traction battery having a plurality of cells, the traction battery being electrically connected to the electric machine such that the traction battery receives charge from the electric machine when operating as a generator; and
    a controller programmed to:
        calculate a lithium plating indicator based on a ratio of differential cell voltage and cell current during charging of the traction battery,
        compare the calculated lithium plating indicator to a target lithium plating indicator, and
        in response to (i) a difference between the target lithium plating indicator and the calculated lithium plating indicator exceeding a threshold and (ii) the engine and electric machine being operated to charge the traction battery, (a) modify a previously stored lookup table of battery charging power vs. temperature and (b) modify an operating point of the internal combustion engine to reduce the difference.

15. The vehicle of claim 14, wherein the controller is further programmed to, in response to (i) the difference between the target lithium plating indicator and the calculated lithium plating indicator exceeding the threshold and (ii) regenerative braking being active, control regenerative braking current to reduce the difference.

16. The vehicle of claim 14, wherein the controller is further programmed to, in response to the difference between the target lithium plating indicator and the calculated lithium plating indicator exceeding the threshold, operate at least one electrical accessory to increase traction battery current.

17. The vehicle of claim 14, the controller is further programmed to, in response to the difference between the target lithium plating indicator and the calculated lithium plating indicator exceeding the threshold, operate a traction battery heater to reduce the difference.

* * * * *